United States Patent [19]

Dehasse

[11] Patent Number: 5,042,544

[45] Date of Patent: Aug. 27, 1991

[54] DEFORMABLE NONPNEUMATIC TIRE WITH RECESSES EXTENDING CROSSWISE OVER THE ENTIRE AXIAL WIDTH OF THE TIRE

[75] Inventor: Benoit Dehasse, Clermont-Ferrand, France

[73] Assignee: Compagnie Generale des Establissments Michelin, Clermont-Ferrand, France

[21] Appl. No.: 582,085

[22] Filed: Sep. 14, 1990

[30] Foreign Application Priority Data

Sep. 28, 1989 [FR] France ................................ 89 12822

[51] Int. Cl.$^5$ ........................... B60B 9/10; B60C 7/10; B60C 7/14
[52] U.S. Cl. ....................................... 152/302; 152/5; 152/7; 152/323; 152/326
[58] Field of Search ................................ 152/310–312, 152/318–322, 316, 246, 323–329, 1, 5, 7, 11–12, 302

[56] References Cited

U.S. PATENT DOCUMENTS

| 2,620,844 | 12/1952 | Lord | 152/326 |
| 2,742,941 | 4/1956 | Johnson | 152/326 |
| 4,945,962 | 8/1990 | Pajtas | 152/7 |

FOREIGN PATENT DOCUMENTS 0297628 1/1989 European Pat. Off. .
1278131 10/1961 France ..................................... 152/7
1408477 7/1965 France .
2350216 12/1977 France .
2357384 2/1978 France .

Primary Examiner—Michael W. Ball
Assistant Examiner—Adrienne C. Johnstone
Attorney, Agent, or Firm—Oblon, Spivak, McClelland, Maier & Neustadt

[57] ABSTRACT

A deformable nonpneumatic tire includes a radially inner, substantially annular, base which may be connected to a rigid element such as a wheel, a radially outer, substantially annular, cap to which a tread having a pattern may be mounted, and a substantially annular deformable structure connected between the base and the cap. The deformable structure includes a plurality of intrinsically dissymmetrical patterns formed by elongate slender elements of an elastically deformable material when seen in section perpendicular to the axial direction of the tire. The slender elements are arranged to define recesses extending crosswise over the entire axial width of the tire. The slender elements are inclined with respect to the radial direction of the tire and form zig-zags at two angles of opposite signs with respect to the radial direction of the tire, such that the orientation of the slender elements changes from one to the other of the angles at least one time between the radially inner and outer ends of the deformable structure.

17 Claims, 10 Drawing Sheets

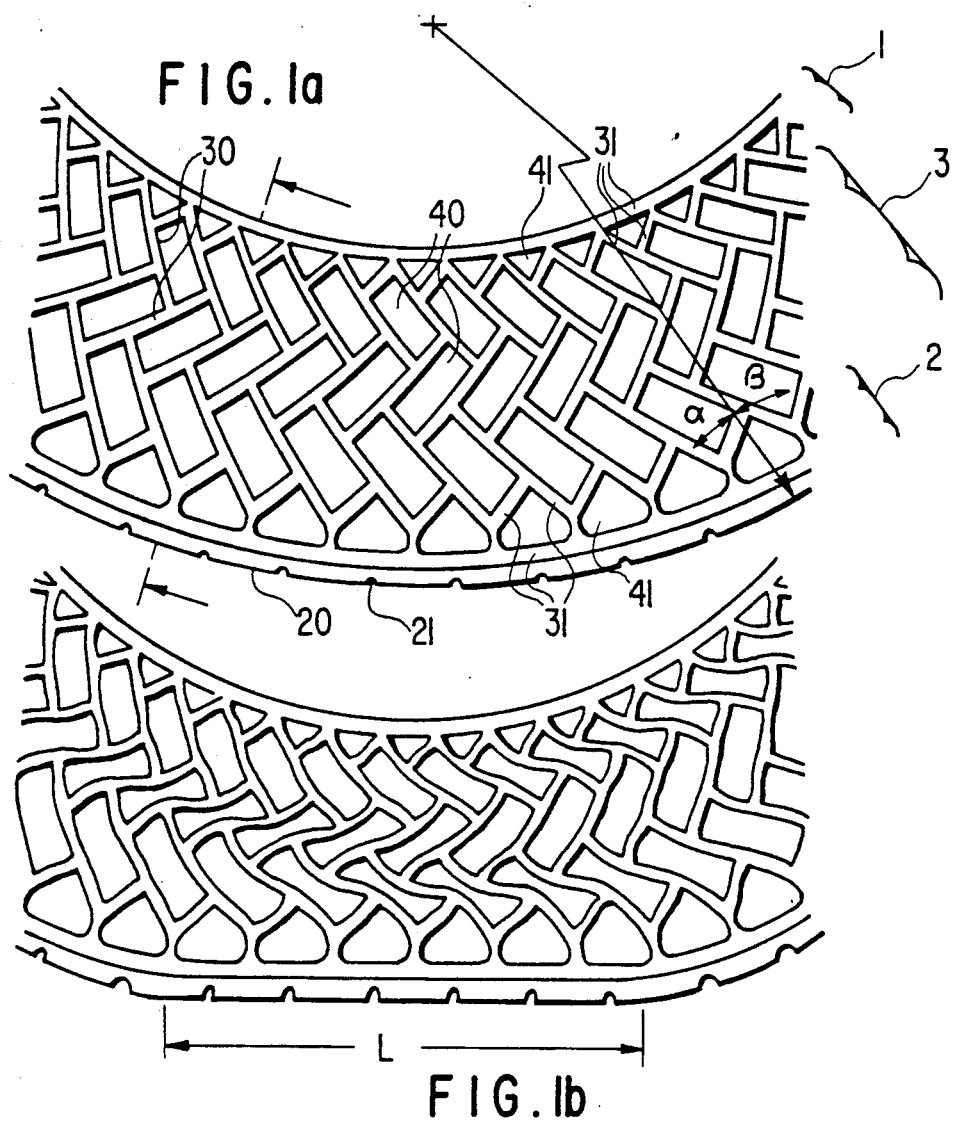
FIG. 1a
FIG. 1b
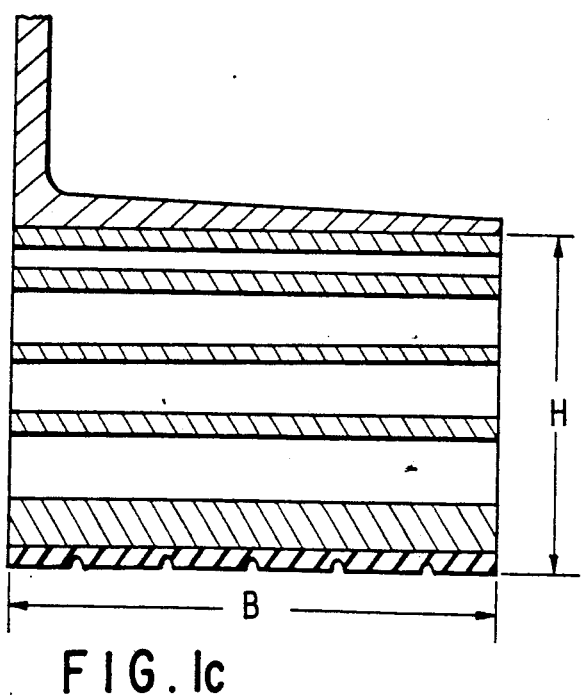
FIG. 1c

1

DEFORMABLE NONPNEUMATIC TIRE WITH RECESSES EXTENDING CROSSWISE OVER THE ENTIRE AXIAL WIDTH OF THE TIRE

BACKGROUND OF THE INVENTION

1. Field of the Invention

This invention relates to deformable nonpneumatic tires, able to be used as substitutes for pneumatic tires on vehicles.

2. Description of the Related Art

Attempts have long been made to design nonpneumatic tires, i.e., tires operating without pressurized air, which are free of the problem posed by pneumatic tires, e.g., punctures or loss of inflation pressure. By way of example, U.S. Pat. No. 2,620,844 or, more recently, patent application EP 0 159 888, can be cited. However, such deformable tires as a general rule provide inadequate road handling because they are incapable of developing the crosswise thrusts necessary to guide the vehicles correctly at speeds in use at present.

SUMMARY OF THE INVENTION

An object of the present invention is to provide a deformable tire whose manufacture is as easy as possible.

The invention also has as an object to produce a deformable tire whose weight and bulk are comparable to those of the pneumatic tires to be replaced.

A further essential object of the invention is to provide a deformable tire that, when it supports its nominal load, develops an area of contact with the road which is comparable to that of pneumatic tires, to achieve good performance and road handling.

The invention also has as an object to control the pressure, due to contact with the ground, in the area of contact with the ground, for example to regulate the contact pressure so that it slightly increases from the leading edge to the end of the area of contact, to increase adhesion at the end of the area of contact where the contribution to the drift thrust is the most significant.

According to the invention, the deformable nonpneumatic tire comprises a base, a deformable structure and a cap, the base providing a transition to a rigid zone, the cap providing the connection with a tire tread. The deformable structure comprises solid parts defining recesses, the recesses extending crosswise over the entire width of the tire. The recesses of the deformable structure, seen in section in any plane perpendicular to the axis of rotation, are all intrinsically dissymmetrical relative to any radial direction. The solid parts are also inclined relative to the radial direction.

By "inclined," is meant an angle which is substantially larger than 0° relative to the radial direction, able to reach 70° relative to this same radial direction. A lower limit of this angle is about 20°. Further, some of the solid parts, called auxiliary elements, can be oriented circumferentially, but never radially.

A significant characteristic of the tire according to the invention is that it forms crosswise recesses all the way through the axial width of the tire. No wall is used to stiffen the recesses thus constituted for fear of not being able to combine the deformability sought with the desirable levels of endurance and road handling. On the other hand, very thin walls for decoration or for protection of the structure can be provided, but in this case the contribution of the optional wall or walls to the stiffness of the tire should be insignificant.

The recesses are to have an intrinsic dissymmetry, i.e., a dissymmetry in the general appearance and not a dissymmetry of detail due, for example, to variations of thickness of the solid parts.

The applicant has found that, due to the dissymmetrical nature of the recesses relative to any radial direction, and by the overlapping achieved, the solid parts constituting the deformable structure itself work, i.e., are stressed, essentially in bending and not essentially in compression. The bending occurs in a plane perpendicular to the axis of rotation. As a result, the material is much better used and the deformability is much more controllable. On the contrary, in the case of conventional structures, of those which are designed to be deformable, either the material is stressed in compression and the structure gives way by buckling, or the structure much too quickly reaches a locking state by the closing of all the existing recesses in the zone between the tire tread and the wheel (i.e., the rigid part).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1a is a partial elevational view showing an arcuate section of a tire according to an embodiment of the invention;

FIG. 1b corresponds to FIG. 1a, but shows the tire of FIG. 1a deformed by contact with the ground;

FIG. 1c is a sectional view of the same embodiment of the invention;

DETAILED DESCRIPTION OF THE PREFERRED EMBODIMENTS

Figure 2A:
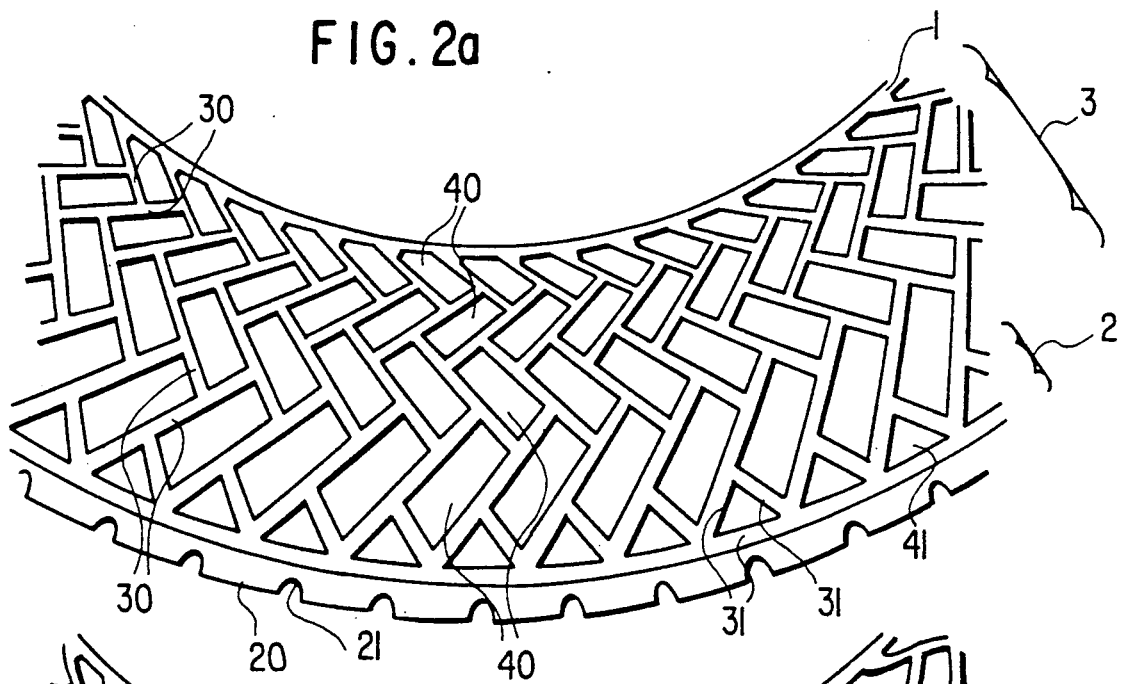
FIG. 2a corresponds to FIG. 1a, but shows a second embodiment of the invention in which only the cap has triangular recesses.

In FIG. 1a, the tire has a base 1 designed for mounting on a rigid wheel rim, and a cap 2, providing the connection with a tire tread 20. The tire tread can be made of rubber and added to the tire according to various well-known methods of retreading pneumatic tires. The tire tread can, of course, have patterns 21 just like in pneumatic tires.

A deformable structure 3 is connected between base 1 and cap 2. This deformable structure has a specific configuration in accordance with this invention. The deformable structure 3 is formed of patterns of interconnected solid parts including slender elements 30 made of a deformable elastic material such as, but not limited to, castable, injectable or moldable materials such as polyurethanes. In the embodiment illustrated in FIGS. 1a and 1b, the slender elements each form zig-zags in the radial direction, although none of the slender elements extends radially. The patterns of slender elements 30 define recesses extending crosswise over the entire axial width of the tire.

Base 1 and cap 2 constitute, in this example, radial extensions of deformable structure 3. They therefore include solid parts 31 which define triangular recesses 41 and which merge smoothly with the slender elements 30. However, as can be seen from the shape of the deformed tire in FIG. 1b, the base 1 and cap 2 do not have a decisive role in the capability of the tire to be deformed. Moreover, since the recesses defined by solid parts 31 are triangular, they are not readily deformable. Base 1 and cap 2 thus respectively constitute transition zones to a rigid zone (e.g., the rigid wheel rim), and to tire tread 20.

The pattern 21 of tire tread 20 can comprise holes 21a permitting the evacuation of water directly through the thickness of the cap and of the tire tread to the recesses 41. The water thus sent into recesses 41 is discharged therefrom by centrifugal force once the recesses in question have move outside of the zone of contact with the road.

As is seen in FIG. 1b, such a tire makes possible a flattening of the tire tread over a large surface, thanks to the crushing or deformation of structure 3. The maximum deformation of the tire is on the order of 10% of outside radius R of the tire, as compared to a tire with a zero deformation. A flexibility in the radial direction comparable to that observed for pneumatic tires and a good adhesion by the surface of the tire tread in contact with the ground result from this.

Further, the continuous recesses 40 and the slender elements 30 are oriented crosswise (i.e., not radially, due to the zig-zag configuration of the slender elements and not circumferentially). This, combined with a great length L of the area of contact, produces a crosswise rigidity able to oppose drift effects, again in a way comparable to the crosswise rigidity obtained by pneumatic tires. This drift resistance is favorable to road handling. If a tire is made whose aspect ratio, commonly called H/B for corresponding pneumatic tires, is preferably less than 0.75, when the tire is stressed in the crosswise direction, it is deformed while keeping the cap and the base approximately parallel to each other in any section through a meridian plane. The type of structure according to the invention, in which the solid parts extend crosswise and connect to one another, gives a rigidity to the crosswise deformation which is comparable to the rigidity of the sidewalls of an inflated pneumatic tire; this crosswise rigidity is favorable to a quick response from the tire to crosswise stresses.

The participation of the elements 30 in the crushing stiffness of the tire is a function of their width (i.e., in the axial direction of the tire) and of the cube of their thickness (i.e., transverse to their length and in the plane of the Figures) because they are stressed essentially in bending. But their participation in the crosswise stiffness necessary to road handling will be a function of their width and of their thickness, because in this case they are stressed essentially in shearing. Therefore, the crosswise stiffness can be increased without affecting the crushing stiffness by increasing the width while also reducing the thickness. For example, a doubling of the width of elements 30, compensated by a reduction of 20% in their thicknesses makes it possible to increase the crosswise rigidity by 60% while the weight will increase in the same proportion.

For the same length L of contact, a larger ground width causes a smaller average pressure, and a larger ground surface for rubber tire tread 20, therefore a higher lateral rigidity and consequently a higher drift resistance, but a thrust threshold of an unchanged value on dry ground (with an unchanged friction coefficient) and a thrust which is developed for a smaller drift angle.

As can be seen in all the embodiments, recesses 40 are part of a pattern between base 1 and cap 2, the pattern being circumferentially repetitive. In all the structures illustrating the invention, if they are considered in a section perpendicular to the axis of rotation of the tire, the solid parts consist of slender elements 30 structurally defining the circumferentially repetitive pattern.

Slender elements 30 are either linear (FIGS. 2 to 5, and 8 to 10) or curved along their length (FIGS. 1, 6 and 7), of a constant or variable thickness depending on the shape of the deformation desired for the tire.

Figure 2B:
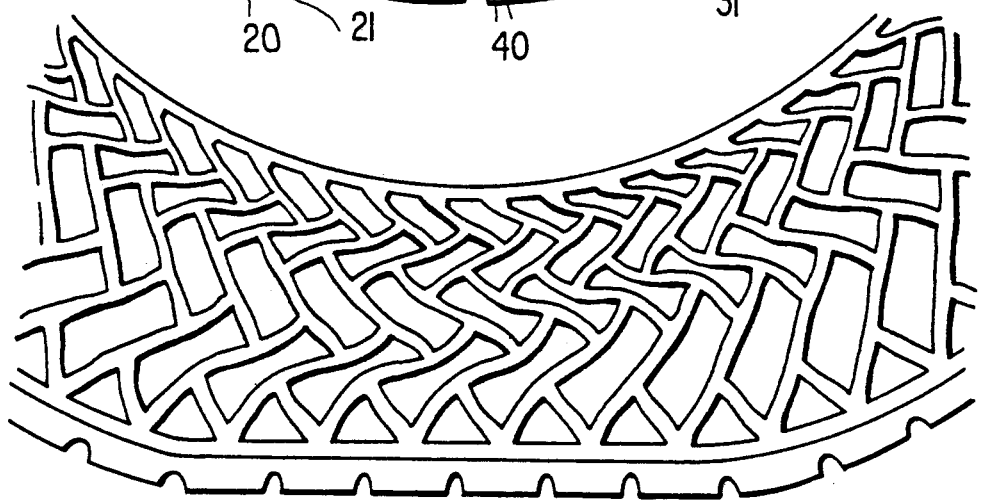
FIG. 2b shows the embodiment of FIG. 2a in contact with the ground.
Figure 3A:
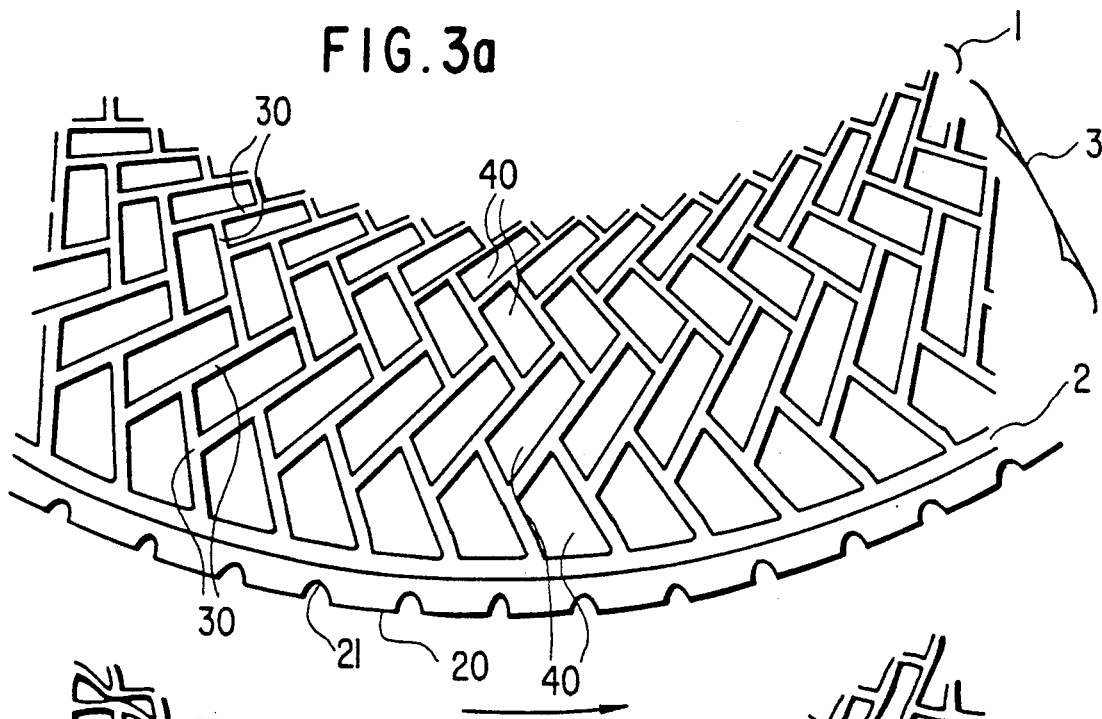
FIG. 3a corresponds to FIG. 1a but discloses an embodiment in which the slender elements are directly connected to the cap, and in which the angles $\alpha$ and $\beta$ are very different.
Figure 3B:
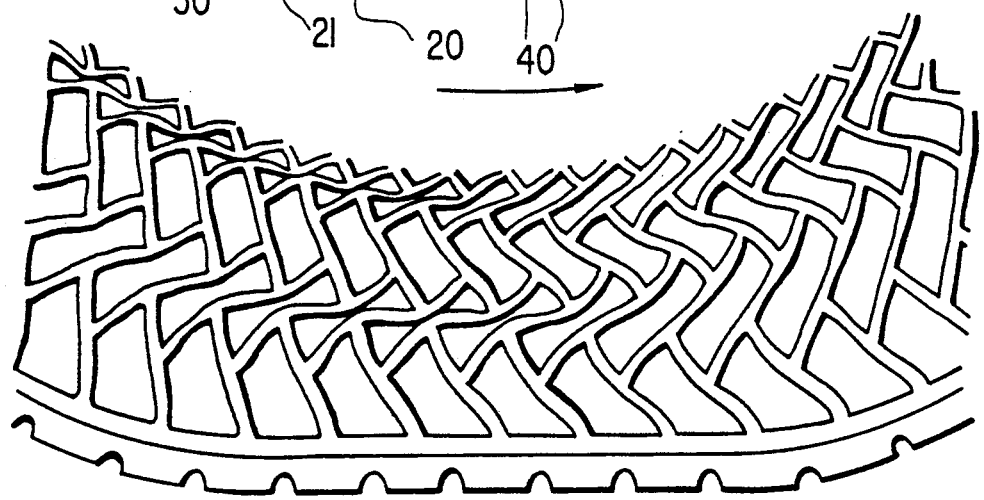
FIG. 3b shows the embodiment of FIG. 3a in contact with the ground.
Figure 4A:
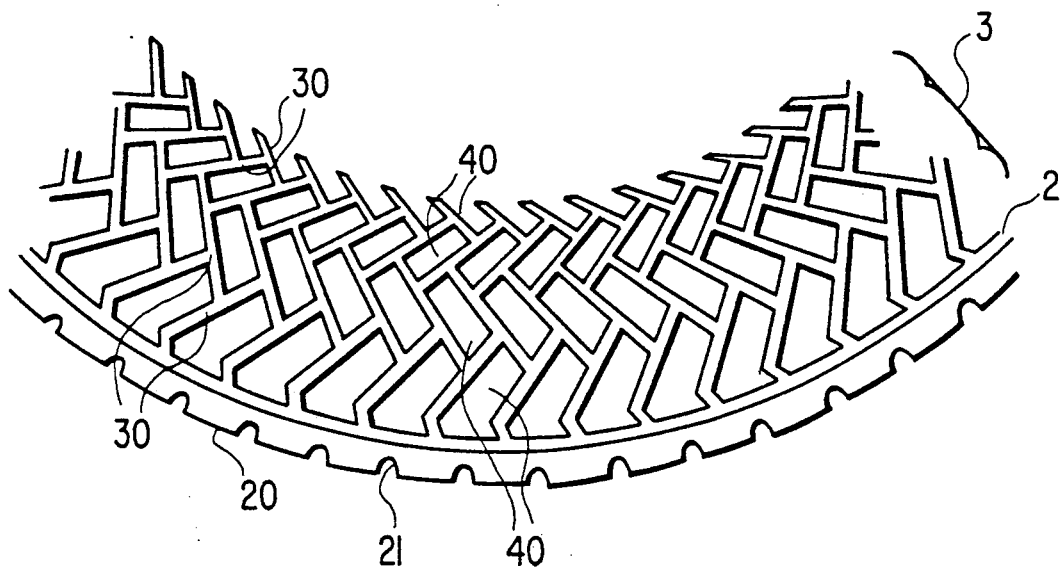
FIG. 4a corresponds to FIG. 1a but shows an embodiment in which the slender elements 30 are directly connected to the cap.
Figure 4B:
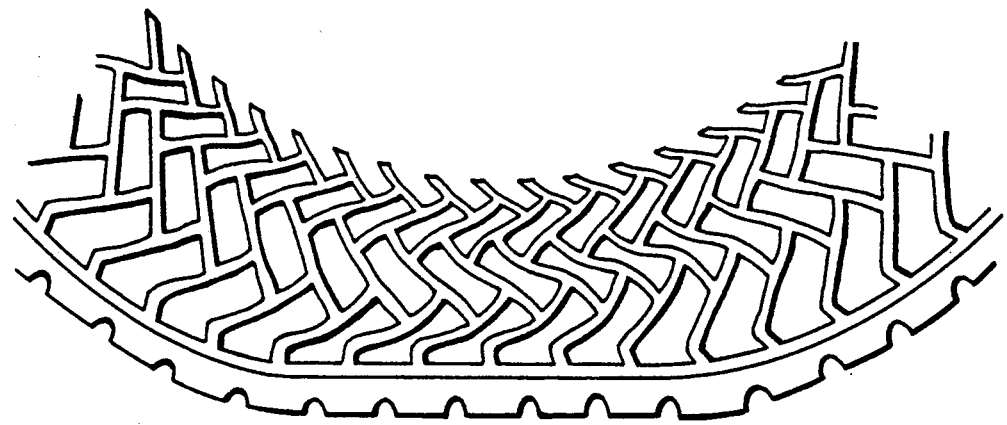
FIG. 4b shows the tire of FIG. 4a in contact with the ground.

Slender elements 30 zig-zag so as to intersect the radial direction according to two angles $\alpha$ and $\beta$ of opposite sign. In FIG. 1, it is seen that $\alpha = \beta$, for a given radial position, which is also the case of FIGS. 2 and 4 to 7. In FIGS. 2, 3, and 4, the absolute value of these angles decreases slightly when the radial position of the measurement draws nearer to tire tread 20, and it remains constant for the other Figures.

In all these embodiments, the solid parts are configured so that movement along said slender elements 30 by advancing from the base to the cap, i.e., by advancing to the radially highest level of any element taken, requires at least one zig-zag, i.e., passage from one angular orientation to the opposite angular orientation.

In FIGS. 1 to 5, and 9 and 10, the recesses are of quadrangular shape, approximately rectangular (FIGS.

Figure 6A:
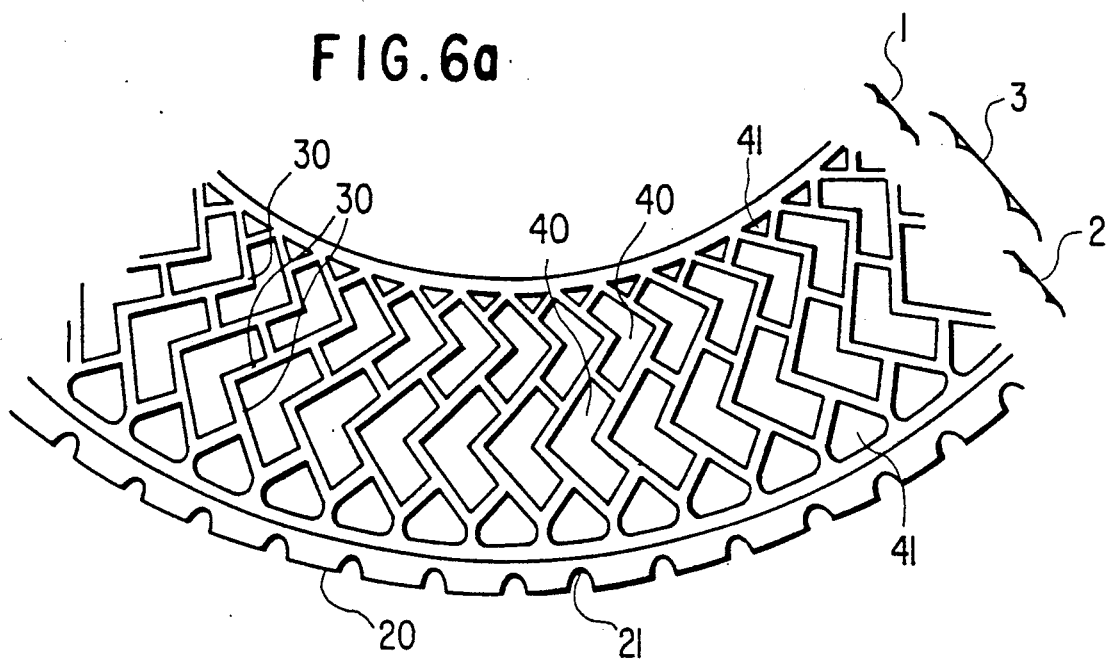
FIG. 6a corresponds to FIG. 1a, but shows an embodiment having chevron shaped recesses.
Figure 6B:
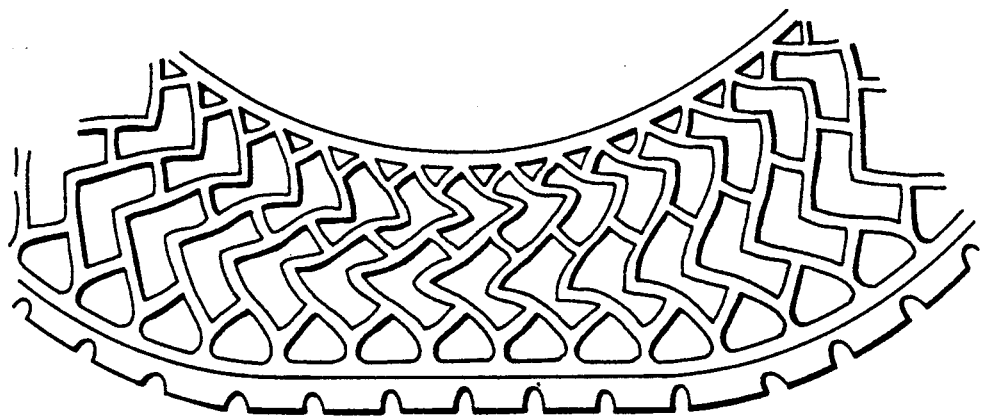
FIG. 6b shows the tire of FIG. 6a in contact with the ground.
Figure 7A:
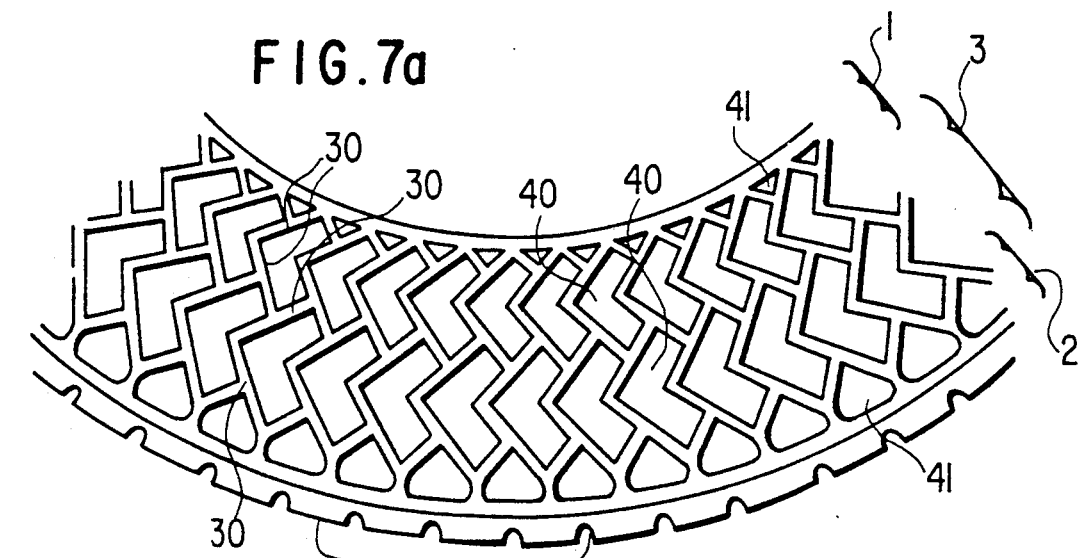
FIG. 7a corresponds to FIG. 1a but shows an embodiment having chevron shaped recesses.
Figure 7B:
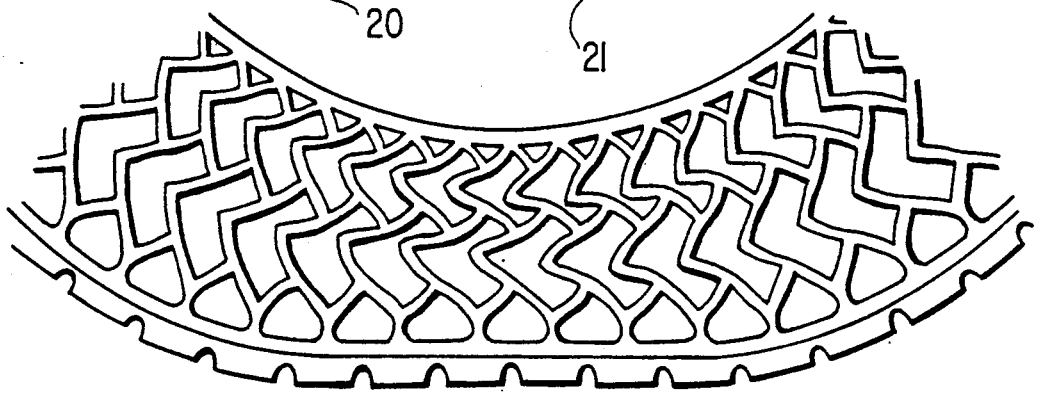
FIG. 7b shows the tire of FIG. 7a in contact with the ground.
Figure 8A:
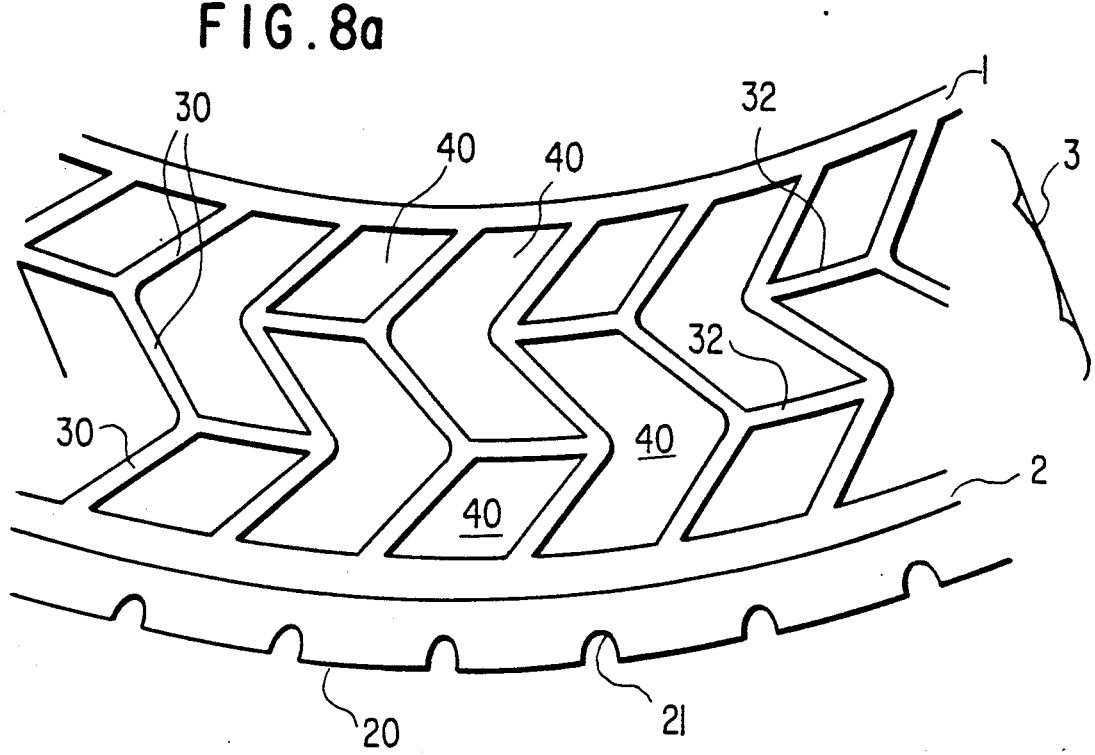
FIG. 8a corresponds to FIG. 1a but shows an embodiment having a circumferentially extending auxiliary elements connecting slender elements of adjacent patterns.
Figure 8B:
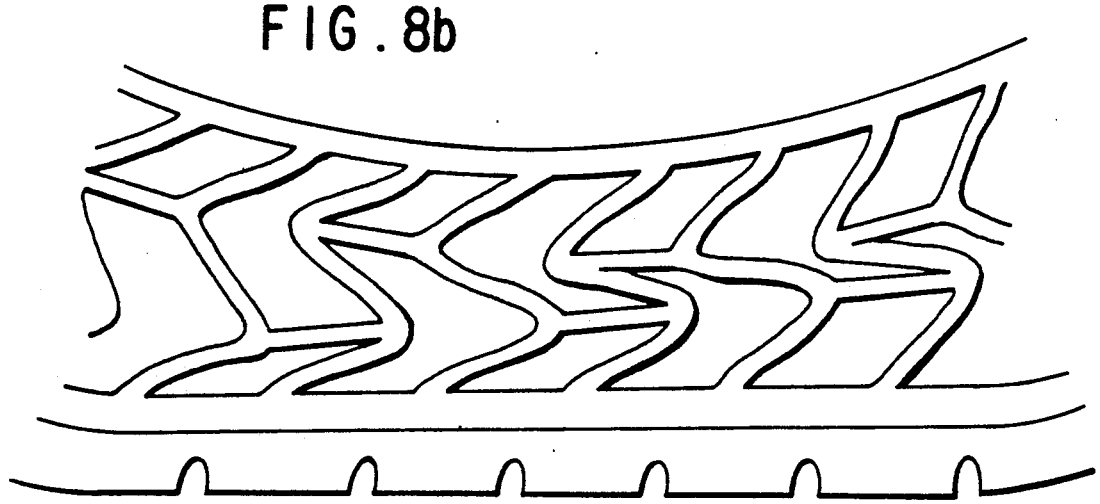
FIG. 8b shows the tire of FIG. 8a in contact with the ground.
Figure 9A:
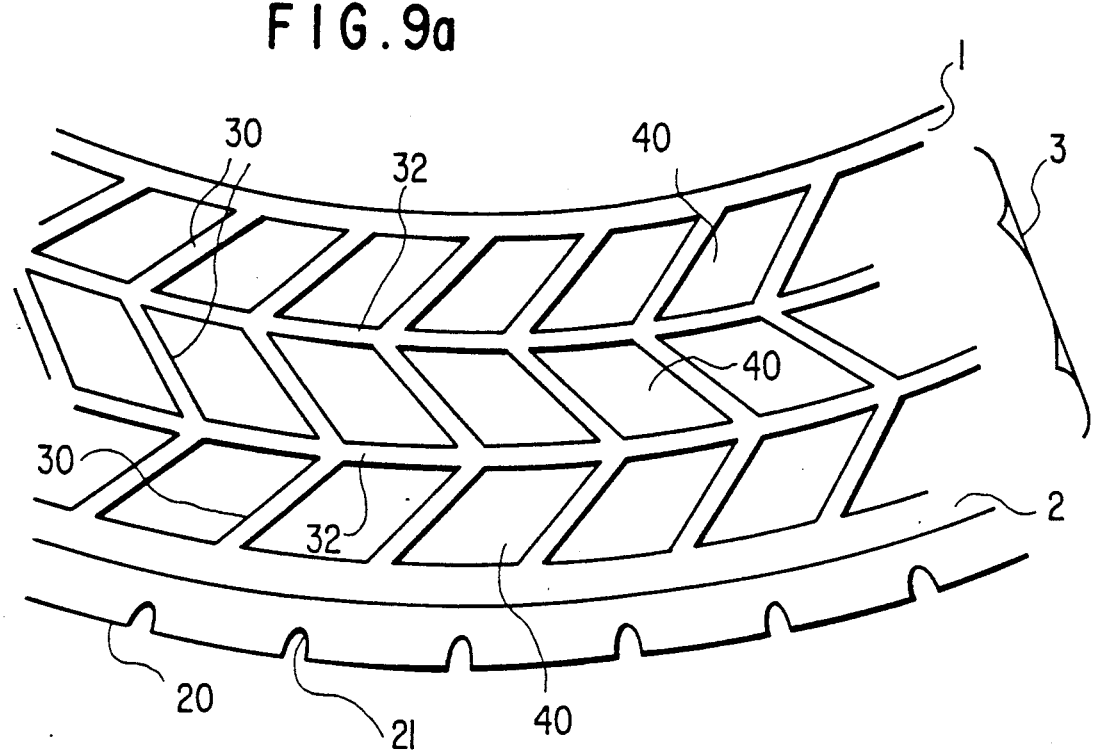
FIG. 9a corresponds to FIG. 1a but shows an embodiment having plural circumferentially extending auxiliary elements for each pattern.
Figure 9B:
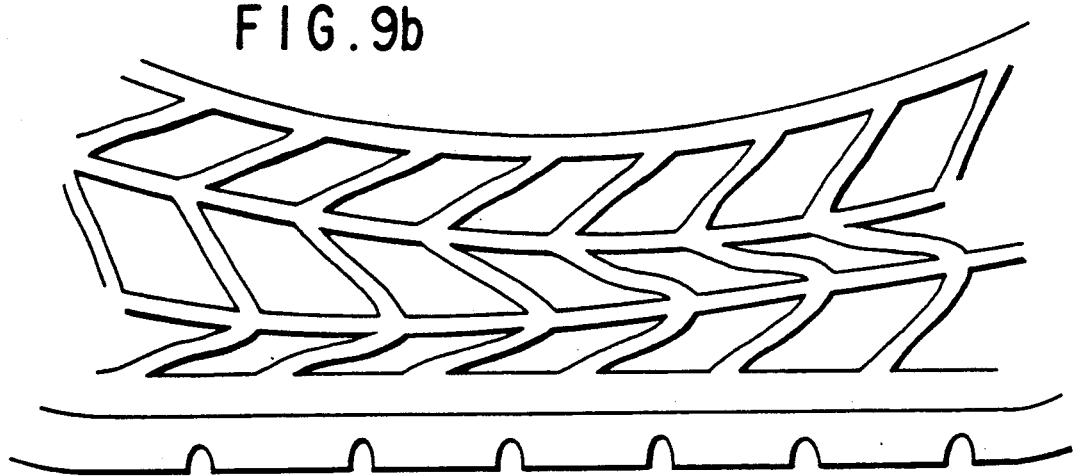
FIG. 9b shows the tire of FIG. 9a in contact with the ground.
Figure 10A:
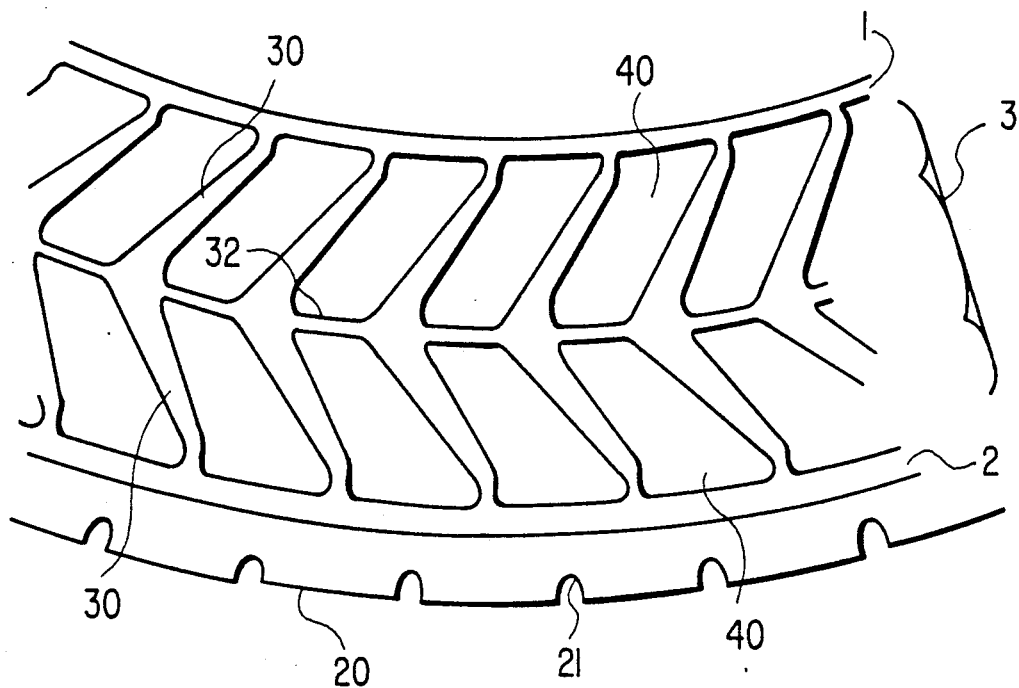
FIG. 10a corresponds to FIG. 1a but shows an embodiment having circumferentially extending auxiliary elements connected to mid-portions of the slender elements.
Figure 10B:
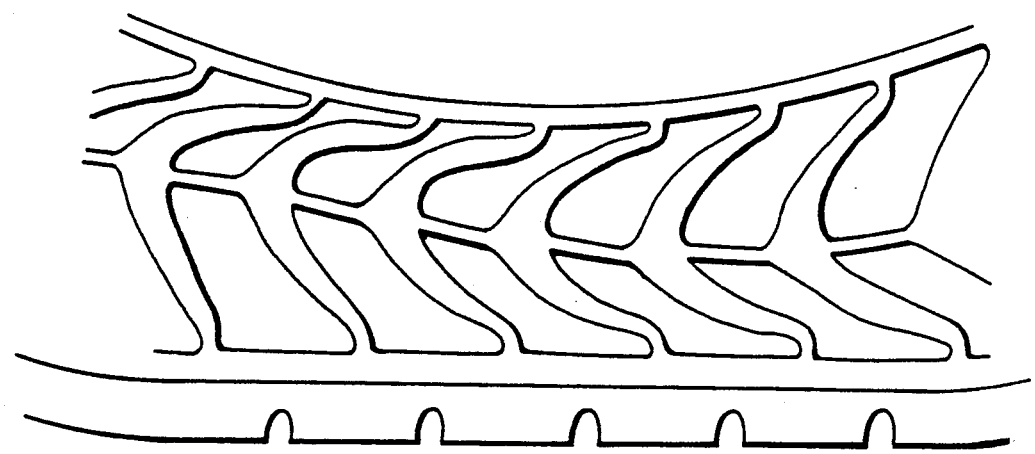
FIG. 10b shows the tire of FIG. 10a in contact with the ground.

1 to 4) or are parallelograms (FIGS. 9 and 10). In FIGS. 6, 7 and 8, recesses are in the shape of chevrons. Most often, in a pattern, two recesses adjacent in the radial direction are circumferentially oriented in opposite directions.

The embodiments of FIGS. 1 and 2 produce a structure 3 which is very homogeneous, very deformable and very stable in deformation; cap 2 forms recesses 41 in the shape of triangles, assuring a gradual transition between deformable structure 3 and tire tread 20. In this way, the ground pressure distribution is fairly uniform. A circumferentially noncontinuous cap 2 can also be made in the case where the desired tread pattern 21 is a sequence of solid blocks engaging the ground. Further, cap 2 can be reinforced, for example in the light of what is known for pneumatic tire belts.

The tire of FIG. 3, whose angles α and β are very different, is intrinsically a little less deformable (with a comparable thickness of elements 30). But it makes it possible to obtain nonsymmetrical ground stresses, in particular an increase of the pressure downstream of the area of contact (see arrows indicating the direction of rotation being considered). The tires of FIGS. 3 and 4 have their elements 30 directly connected to cap 2. This causes a slight undulation of the tire tread (seen in a section perpendicular to the axis of rotation), which is very favorable to adhesion on loose ground, as is well known in the art for pneumatic tires.

Figure 5A:
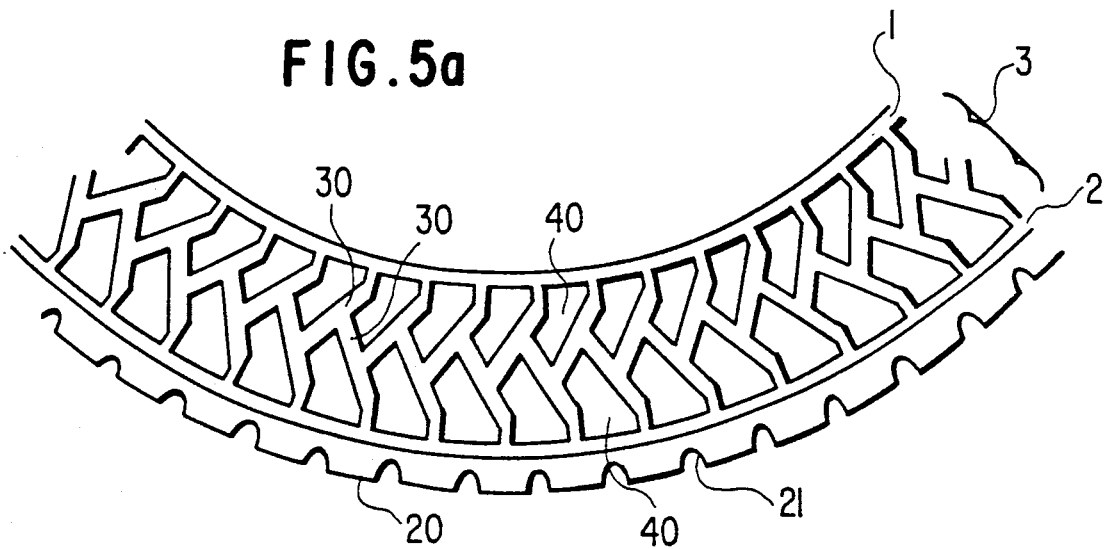
FIG. 5a corresponds to FIG. 1a but shows an embodiment in which the pattern consists of two types of slender elements.
Figure 5B:
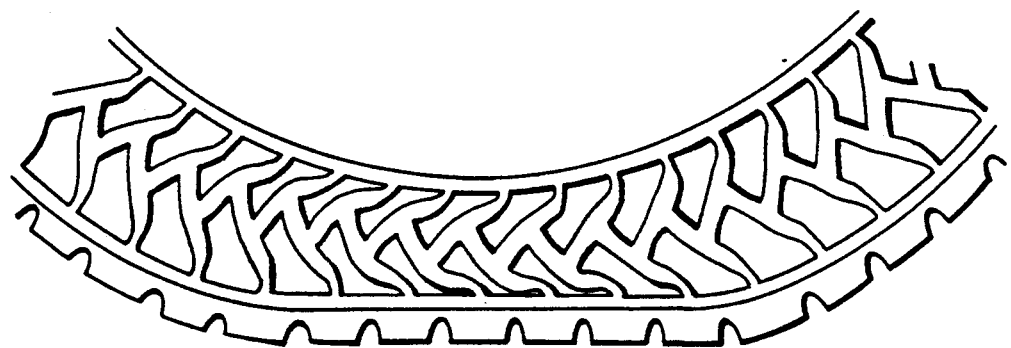
FIG. 5b shows the tire of FIG. 5a in contact with the ground.

In FIG. 5, a tire is seen whose pattern consists of two elements 30, the first being fixed at one of its ends to the base 1, and at the other end approximately to the middle of the second element, the second element being fixed at one of its ends approximately to the middle of first element 30 of an adjacent pattern, and at the other end to cap 2. Elements 30 exhibit a thinning at those of their ends respectively fixed to the base and to the cap. This very simple variant gives good results, in particular it is completely sufficient to be used in a wheel for temporary use.

In FIGS. 8, 9 and 10, it is seen that elements 30 of one pattern are connected to elements 30 of the adjacent pattern by auxiliary elements 32 placed circumferentially.

The total number of patterns will be chosen as a function of the desired number of elements 30 in the area of contact, taking into account the shape of the distribution of desired pressure. Such considerations are completely comparable to those made for pneumatic tire treads, the comparison being between elements 30 and the rubber blocks in a tread pattern. All the structures according to the invention necessarily have longitudinal dissymmetrical characteristics. This dissymmetrical nature makes it possible to produce a tire in which the ground contact pressure increases from the leading edge to the end of the area of contact, in view of a given direction of rotation. This phenomenon can be amplified, or compensated for, according to the object sought for a given application. The base makes it possible to use any type of connection or attachment with a rigid wheel rim. The wheel can also be made unitary with the tire of the invention, the base then constituting a transition zone between the actually deformable structure 3 and the rigid wheel.

The usable materials are all castable, injectable, or moldable materials. Polyurethanes are particularly very suitable. These materials should, of course, be able to elastically resist deformations linked to the operation of the tire and to permit the passages of obstacles in the same way as does a pneumatic tire. A fairly simple choice can be made on the basis of the calculation of a significant magnitude linked to the load that a unit section of the tire is capable of carrying, therefore linked to the average ground pressure, itself an image of the inflation pressure of the pneumatic tires that the invention is able to replace.

This magnitude, that can be connected to the functioning of the material bent during the crushing of the tire, is equivalent to the product of extension/compression modulus E of the material, expressed in megapascals by the cube of its deformation rate $\epsilon$, expressed in %.

This magnitude $E\epsilon^3$ is to be equivalent to about 50,000 megapascals for passenger cars and can increase to more than 200,000 megapascals for industrial vehicles.

For passenger cars, polyurethanes are particularly very suitable, with moduli greater than 20 MPa measured on a test piece at 2% extension and at 20° C. and preferably greater than 40 MPa to keep the tires with a weight equivalent to that of pneumatic tires.

For example, a polyester TDI 4,4'-methylene bis ortho chloroaniline with a modulus at 50 MPa is satisfactory for the example shown in FIGS. 1-10.

In this case, magnitude $E\epsilon^3$ is equivalent to 50,000 by accepting a deformation rate in use of 10%, knowing that from this material an occasional deformation rate greater than five time the latter can be expected to preserve the integrity of the tire during the passage of obstacles.

The object of this invention is to provide a tire substitutable for pneumatic tires. The proposed structure is therefore optimized for this purpose. However, it can be considered to incorporate a similar tire inside of a pneumatic tire to constitute an inner support, thus providing the pneumatic tire with the capability of traveling deflated.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A deformable nonpneumatic tire comprising:
    a radially inner, substantially annular, base;
    a radially outer, substantially annular, cap; and
    a substantially annular, deformable structure connected between said base and said cap, said deformable structure comprising a plurality of intrinsically dissymmetrical patterns formed by elongate slender elements of an elastically deformable material when seen in a section perpendicular to the axial direction of the tire, said slender elements being arranged to define recesses extending crosswise over the entire axial width of the tire,
    wherein said slender elements of a respective pattern are inclined with respect to the radial direction of the tire at two angles of opposite signs with respect to the radial direction of the tire, such that the orientation of each of said slender elements changes from one to the other of said angles at least one time between the radially inner and outer ends of said deformable structure.

2. The tire of claim 1 wherein said patterns are repetitive in the circumferential direction of the tire.

3. The tire of claim 1 wherein said base comprises solid parts defining triangular recesses.

4. The tire of claim 1 wherein said cap comprises solid parts defining triangular recesses.

5. The tire of claim 2 wherein said recesses are of quadrangular shape.

6. The tire of claim 5 wherein said recesses comprise parallelograms.

7. The tire of claim 5 wherein said recesses are rectangular.

8. The tire of claim 2 wherein said recesses comprise chevrons.

9. The tire of claim 5, wherein for each of said patterns any adjacent ones of said recesses are circumferentially oriented in opposite directions.

10. The tire of claim 2 wherein said patterns are comprised by two types of said slender elements, a first type of said slender elements having one end fixed to said base and another end fixed to a mid-portion of a second type of said slender elements, said second type of said slender elements having one end fixed to a mid-portion of a first type of said slender elements in an adjacent pattern and another end fixed to said cap.

11. The tire of claim 10 wherein said ends of said slender elements which are respectively fixed to said base and said cap are thinner than the remainder of said slender elements.

12. The tire of claim 10 wherein said second type of slender elements have a reinforcement at said another end thereof.

13. The tire of claim 2 including circumferentially extending auxiliary elements connected between said slender elements of adjacent patterns.

14. The tire of claim 1 wherein the absolute value of said two angles is between 20° and 70°.

15. The tire of claim 1 including a tread mounted to said cap.

16. The tire of claim 3 including a tread mounted to said cap.

17. The tire of claim 16 including holes extending from said tread to said triangular recesses.

* * * * *